United States Patent
Motoda

(10) Patent No.: US 12,331,178 B2
(45) Date of Patent: Jun. 17, 2025

(54) RUBBER COMPOSITIONS

(71) Applicant: KURARAY CO., LTD., Okayama (JP)

(72) Inventor: Satoshi Motoda, Tokyo (JP)

(73) Assignee: KURARAY CO., LTD., Okayama (JP)

( * ) Notice: Subject to any disclaimer, the term of this patent is extended or adjusted under 35 U.S.C. 154(b) by 785 days.

(21) Appl. No.: 17/255,433

(22) PCT Filed: Jun. 21, 2019

(86) PCT No.: PCT/JP2019/024630
§ 371 (c)(1),
(2) Date: Dec. 23, 2020

(87) PCT Pub. No.: WO2020/004242
PCT Pub. Date: Jan. 2, 2020

(65) Prior Publication Data
US 2021/0139666 A1   May 13, 2021

(30) Foreign Application Priority Data

Jun. 29, 2018 (JP) ................................ 2018-124663
Apr. 2, 2019 (JP) ................................ 2019-070481

(51) Int. Cl.
| | |
|---|---|
| C08K 3/04 | (2006.01) |
| C08C 19/25 | (2006.01) |
| C08K 3/36 | (2006.01) |
| C08K 5/54 | (2006.01) |
| C08L 7/00 | (2006.01) |
| C08L 9/00 | (2006.01) |
| C08L 15/00 | (2006.01) |
| C08L 21/00 | (2006.01) |
| C08L 23/16 | (2006.01) |

(52) U.S. Cl.
CPC .................. *C08K 3/04* (2013.01); *C08K 3/36* (2013.01); *C08L 9/00* (2013.01); *C08L 15/00* (2013.01); *C08L 2312/02* (2013.01)

(58) Field of Classification Search
CPC ................ C08K 3/36; C08K 2201/006; C08L 2207/324; C08L 15/00; C08L 23/16; C08L 9/00
See application file for complete search history.

(56) References Cited

U.S. PATENT DOCUMENTS

| | | | |
|---|---|---|---|
| 9,493,637 B2 | 11/2016 | Maejima et al. | |
| 2008/0308208 A1* | 12/2008 | Wakabayashi | C08L 15/00 524/515 |
| 2010/0152368 A1* | 6/2010 | Hirayama | C08L 21/00 524/570 |
| 2014/0080978 A1* | 3/2014 | Ohi | C08F 136/08 525/333.1 |
| 2014/0100321 A1 | 4/2014 | Maejima et al. | |
| 2017/0009065 A1 | 1/2017 | Koda et al. | |
| 2017/0239982 A1* | 8/2017 | Fontaine | B60C 11/00 |
| 2019/0263979 A1* | 8/2019 | Hardiman | C09C 1/3081 |

FOREIGN PATENT DOCUMENTS

| | | |
|---|---|---|
| CN | 101323679 A | 12/2008 |
| CN | 103492471 A | 1/2014 |
| CN | 106068302 A | 11/2016 |
| EP | 2014710 A1 | 1/2009 |
| JP | 2000344949 A | 12/2000 |
| JP | 2006199899 A | 8/2006 |
| JP | 2008239885 A | 10/2008 |
| JP | 200930016 A | 2/2009 |
| JP | 201287209 A | 5/2012 |
| JP | 2012087209 A * | 5/2012 |
| JP | 2013237864 A | 11/2013 |
| JP | 201480504 A | 5/2014 |
| JP | 201586280 A | 5/2015 |
| JP | 2015105278 A | 6/2015 |
| WO | 2015137296 A1 | 9/2015 |
| WO | 2018043700 A1 | 3/2018 |

OTHER PUBLICATIONS

Ihara, electronic translation of JP 2012087209, May 2012.*
Extended European Search Report in EP Application No. 19827274. 2, dated Sep. 21, 2021, 5pp.
International Search Report in PCT Application No. PCT/JP2019/024630, mailed Aug. 6, 2019, 4pp.
Written Opinion in PCT Application No. PCT/JP2019/024630, mailed Aug. 6, 2019, 9pp.

* cited by examiner

*Primary Examiner* — Ha S Nguyen
(74) *Attorney, Agent, or Firm* — HAUPTMAN HAM, LLP

(57) ABSTRACT

The present invention provides a rubber composition capable of giving cured products excellent in durability and vibration insulating properties. The present invention also provides a cured product of the composition, and a rubber vibration insulator using the cured product. The rubber composition includes a solid rubber (A), a liquid diene rubber (B), a silane coupling agent (C), and silica (D) having a BET specific surface area of 15 to 250 m²/g.

3 Claims, No Drawings

RUBBER COMPOSITIONS

RELATED APPLICATIONS

The present application is a National Phase of International Application No. PCT/JP2019/024630, filed Jun. 21, 2019, and claims priority based on Japanese Patent Application No. 2018-124663, filed Jun. 29, 2018 and Japanese Patent Application No. 2019-070481, filed Apr. 2, 2019.

TECHNICAL FIELD

The present invention relates to rubber compositions.

BACKGROUND ART

Fillers such as silica and carbon black are conventionally added to rubber components such as natural rubbers, styrene butadiene rubbers and ethylene propylene diene rubbers to enhance mechanical strength and other characteristics. Such rubber compositions and cured products obtained by cross-linking the compositions have been studied to explore use in various applications. For example, filler-reinforced rubber vibration insulators have been studied.

For example, Patent Literature 1 discloses a rubber composition including a diene rubber, silica and a silane coupling agent.

CITATION LIST

Patent Literature

Patent Literature 1: JP-A-2008-239885

SUMMARY OF INVENTION

Technical Problem

In the formulation of conventional rubber compositions, unfortunately, the durability of the obtainable cured products is enhanced at the cost of vibration insulating properties. On the other hand, the formulation for enhancing the vibration insulating properties of the obtainable cured products sacrifices durability. Thus, it has been difficult to enhance durability and vibration insulating properties at the same time.

The present invention has been made in view of the circumstances discussed above, and provides a rubber composition capable of giving cured products excellent in durability and vibration insulating properties. The present invention also provides a cured product of the composition, and a rubber vibration insulator using the cured product.

Solution to Problem

As a result of extensive studies, the present inventor has found that a rubber composition that include components including a solid rubber, a liquid diene rubber, a silane coupling agent, and silica with specific properties can be cross linked to give a cured product having excellent durability and vibration insulating properties. The present invention has been completed based on the finding.

Specifically, the present invention pertains to the following [1] to [4].

[1] A rubber composition including a solid rubber (A), a liquid diene rubber (B), a silane coupling agent (C), and silica (D) having a BET specific surface area of 15 to 250 m$^2$/g.

[2] The rubber composition described in [1], which includes a product formed by covalent bonding of the liquid diene rubber (B) and at least part of the silane coupling agent (C).

[3] A cured product obtained by crosslinking the rubber composition described in [1] or [2].

[4] A rubber vibration insulator including the cured product described in [3].

Advantageous Effects of Invention

The rubber compositions according to the present invention are crosslinked to give cured products excellent in durability and vibration insulating properties. Such cured products are useful in, for example, rubber vibration insulators.

DESCRIPTION OF EMBODIMENTS

[Solid Rubbers (A)]

A rubber composition of the present invention includes a solid rubber (A). The solid rubber (A) used in the rubber composition of the present invention is a rubber that can be handled as a solid at 20° C. The Mooney viscosity $ML_{1+4}$ of the solid rubber (A) at 100° C. is usually in the range of 20 to 200. The Mooney viscosity $ML_{1+4}$ in the present invention is measured with a Mooney viscometer by heating a measurement sample to 100° C. and rotating the rotor at a constant rotational speed while measuring the torque, the value after 1 minute of preheating and 4 minutes from the start of the rotation being adopted. Examples of the solid rubbers (A) include natural rubbers (NRs), styrene butadiene rubbers (hereinafter, also written as "SBRs"), butadiene rubbers, isoprene rubbers, butyl rubbers, halogenated butyl rubbers, ethylene-α-olefin elastomers such as ethylene propylene diene rubbers (EPDMs), butadiene acrylonitrile copolymer rubbers, chloroprene rubbers, acrylic rubbers, fluororubbers, hydrogenated nitrile rubbers and urethane rubbers. Among these solid rubbers (A), natural rubbers, SBRs, butadiene rubbers, isoprene rubbers and ethylene propylene diene rubbers are preferable, and natural rubbers and ethylene propylene diene rubbers are more preferable. The solid rubbers (A) may be used singly, or two or more may be used in combination.

To ensure that the obtainable rubber composition and cured products will fully exhibit their characteristics, the number average molecular weight (Mn) of the solid rubber (A) is preferably not less than 80,000, and more preferably in the range of 100,000 to 3,000,000. In the present specification, the number average molecular weight is the polystyrene equivalent number average molecular weight measured by gel permeation chromatography (GPC).

Examples of the natural rubbers include such natural rubbers as TSRs (technically specified rubbers) such as SMRs (standard Malaysia rubbers, TSRs from Malaysia), SIRs (standard Indonesia rubbers, TSRs from Indonesia) and STRs (standard Thai rubbers, TSRs from Thailand), and RSSs (ribbed smoked sheets); and modified natural rubbers such as high-purity natural rubbers, epoxidized natural rubbers, hydroxylated natural rubbers, hydrogenated natural rubbers and grafted natural rubbers. In particular, SMR 20 (natural rubber from Malaysia), STR 20 (natural rubber from Thailand) and RSS #3 (natural rubber from Thailand) are preferable from the points of view of stable quality and high availability. The natural rubbers may be used singly, or two or more may be used in combination.

While the EPDMs are not particularly limited, it is preferable that the ethylene content thereof be 50 to 70 mass %, the diene content thereof be 3 to 10 mass %, and the diene component be ethylidenenorbornene (ENB). When the EPDM has such a structure as described above, cured products attain an excellent balance in heat resistance, vibration insulating properties and durability. From points of view such as processability, the Mooney viscosity $ML_{1+4}$ (125° C.) of the EPDMs is preferably 50 to 80. The EPDMs may be oil-extended. The ethylene-α-olefin elastomers such as EPDMs may be composed of a single type of elastomer, or may be composed of a plurality of types of elastomers.

[Liquid Diene Rubbers (B)]

The rubber composition of the present invention includes a liquid diene rubber (B). The liquid diene rubber (B) used in the present invention is a liquid polymer that includes conjugated diene units as monomer units constituting the polymer. Examples of the conjugated dienes include butadiene, isoprene; and conjugated dienes (b1) other than butadiene and isoprene, such as 2,3-dimethylbutadiene, 2-phenylbutadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene, chloroprene and farnesene. The conjugated diene units contained in the liquid diene rubber (B) preferably include monomer units from isoprene and/or butadiene.

In a preferred embodiment of the liquid diene rubber (B), 50 mass % or more of all the monomer units constituting the polymer are monomer units from isoprene and/or butadiene. The total content of the isoprene units and the butadiene units is preferably 60 to 100 mass %, more preferably 70 to 100 mass %, still more preferably 80 to 100 mass %, particularly preferably 90 to 100 mass %, and most preferably substantially 100 mass % of all the monomer units in the liquid diene rubber (B). When the total content of the isoprene units and the butadiene units is in the above range, the liquid diene rubber (B) exhibits a viscosity that is not excessively high and thus can be handled easily.

The liquid diene rubber (B) may include additional monomer units other than the isoprene units and the butadiene units, for example, units from the aforementioned conjugated dienes (b1) other than butadiene and isoprene, and units from aromatic vinyl compounds (b2).

Examples of the aromatic vinyl compounds (b2) include styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene and divinylbenzene. Among these aromatic vinyl compounds, styrene, α-methylstyrene and 4-methylstyrene are preferable.

The content of the additional monomer units other than the butadiene units and the isoprene units in the liquid diene rubber (B) is preferably not more than 50 mass %, more preferably not more than 45 mass %, still more preferably not more than 40 mass %, particularly preferably not more than 35 mass %, and most preferably not more than 30 mass %. When, for example, the rubber contains units from the aromatic vinyl compound (b2) in the above range, the processability of the rubber composition tends to be enhanced.

The liquid diene rubber (B) is preferably a polymer obtained by, for example, emulsion polymerization, solution polymerization or the like of a conjugated diene and optionally an additional monomer other than conjugated dienes.

The emulsion polymerization may be performed by a process that is known or deemed as known. For example, predetermined amounts of monomers including a conjugated diene are emulsified and dispersed in the presence of an emulsifier, and are emulsion polymerized with a radical polymerization initiator.

Examples of the emulsifiers include long-chain fatty acid salts having 10 or more carbon atoms, and rosin acid salts. Examples of the long-chain fatty acid salts include potassium salts and sodium salts of fatty acids such as capric acid, lauric acid, myristic acid, palmitic acid, oleic acid and stearic acid.

The dispersion medium is usually water and may include a water-soluble organic solvent such as methanol or ethanol as long as the stability during polymerization is not impaired.

Examples of the radical polymerization initiators include persulfate salts such as ammonium persulfate and potassium persulfate, organic peroxides and hydrogen peroxide.

A chain transfer agent may be used to control the molecular weight of the liquid diene rubber (B) that is obtained. Examples of the chain transfer agents include mercaptans such as t-dodecylmercaptan and n-dodecylmercaptan; carbon tetrachloride, thioglycolic acid, diterpene, terpinolene, γ-terpinene and α-methylstyrene dimer.

The temperature of the emulsion polymerization may be selected appropriately in accordance with factors such as the type of the radical polymerization initiator used, but is usually in the range of 0 to 100° C., and preferably in the range of 0 to 60° C. The polymerization mode may be continuous or batchwise.

The polymerization reaction may be terminated by the addition of a polymerization terminator. Examples of the polymerization terminators include amine compounds such as isopropylhydroxylamine, diethylhydroxylamine and hydroxylamine, quinone compounds such as hydroquinone and benzoquinone, and sodium nitrite.

The termination of the polymerization reaction may be followed by the addition of an antioxidant as required. After the termination of the polymerization reaction, the latex obtained is cleaned of the unreacted monomers as required, and the liquid diene rubber (B) is coagulated by the addition of a coagulant salt such as sodium chloride, calcium chloride or potassium chloride optionally together with an acid such as nitric acid or sulfuric acid to control the pH of the coagulated system to a predetermined value. The dispersion medium is then separated, thereby recovering the polymer. Next, the polymer is washed with water, then dehydrated and dried. The liquid diene rubber (B) may be thus obtained. During the coagulation process, the latex may be mixed together with an emulsified dispersion of an extender oil as required, and the liquid diene rubber (B) may be recovered as an oil-extended rubber.

The solution polymerization may be performed by a process that is known or deemed as known. For example, monomers including a conjugated diene are polymerized in a solvent using a Ziegler catalyst, a metallocene catalyst, or an active metal or active metal compound capable of catalyzing anionic polymerization, optionally in the presence of a polar compound.

Examples of the solvents include aliphatic hydrocarbons such as n-butane, n-pentane, isopentane, n-hexane, n-heptane and isooctane; alicyclic hydrocarbons such as cyclopentane, cyclohexane and methylcyclopentane; and aromatic hydrocarbons such as benzene, toluene and xylene.

Examples of the active metals capable of catalyzing anionic polymerization include alkali metals such as lithium, sodium and potassium; alkaline earth metals such as beryllium, magnesium, calcium, strontium and barium; and lanthanoid rare earth metals such as lanthanum and neodymium. Among the active metals capable of catalyzing anionic polymerization, alkali metals and alkaline earth metals are preferable, and alkali metals are more preferable.

Preferred active metal compounds capable of catalyzing anionic polymerization are organoalkali metal compounds. Examples of the organoalkali metal compounds include organolithium compounds, organosodium compounds and organopotassium compounds. Examples of the organolithium compounds include organomonolithium compounds such as methyllithium, ethyllithium, n-butyllithium, sec-butyllithium, t-butyllithium, hexyllithium, phenyllithium and stilbenelithium; and polyfunctional organolithium compounds such as dilithiomethane, dilithionaphthalene, 1,4-dilithiobutane, 1,4-dilithio-2-ethylcyclohexane and 1,3,5-trilithiobenzene. Examples of the organosodium compounds include sodium naphthalene. Examples of the organopotassium compounds include potassium naphthalene. Among these compounds, organolithium compounds are preferable, and organomonolithium compounds are more preferable.

The amount in which the organoalkali metal compound is used may be determined appropriately in accordance with factors such as the melt viscosity and molecular weight of the liquid diene rubber (B), but is preferably 0.01 to 50 parts by mass, more preferably 0.1 to 25 parts by mass, still more preferably 0.1 to 10 parts by mass, even more preferably 0.01 to 3 parts by mass, and particularly preferably 0.03 to 3 parts by mass per 100 parts by mass of all the monomers including a conjugated diene.

The organoalkali metal compound may be used in the form of an organoalkali metal amide by being reacted with a secondary amine such as dibutylamine, dihexylamine or dibenzylamine.

Polar compounds are usually used in anionic polymerization to control the microstructure (for example, the vinyl content) of conjugated diene moieties without deactivating the reaction. Examples of the polar compounds include ether compounds such as dibutyl ether, tetrahydrofuran and ethylene glycol diethyl ether; tertiary amines such as tetramethylethylenediamine and trimethylamine; alkali metal alkoxides and phosphine compounds. The polar compound is usually used in an amount of 0.01 to 1000 mol per mol of the organoalkali metal compound.

The temperature of the solution polymerization is usually in the range of −80 to 150° C., preferably in the range of 0 to 100° C., and more preferably in the range of 10 to 90° C. The polymerization mode may be batchwise or continuous.

The polymerization reaction may be terminated by the addition of a polymerization terminator. Examples of the polymerization terminators include alcohols such as methanol and isopropanol. The liquid diene rubber (B) may be isolated by pouring the polymerization reaction solution obtained into a poor solvent such as methanol to precipitate the liquid diene rubber (B), or by washing the polymerization reaction solution with water, followed by separation and drying.

Among the above processes for the production of the liquid diene rubber (B), the solution polymerization is preferable. The liquid diene rubber (B) obtained as described above may be used directly without modification or may be used after the hydrogenation of at least part of the carbon-carbon unsaturated bonds present in the liquid diene rubber. Further, the liquid diene rubber (B) that is used may be a modified liquid diene rubber (B1) obtained by, for example, the addition of a modifying agent or the like.

In a preferred embodiment, the liquid diene rubber (B) forms a covalent bond with at least part of a silane coupling agent (C) described later. Specifically, the liquid diene rubber that is unmodified or at least partially hydrogenated preferably reacts with at least part of a silane coupling agent (C) to form a product by the covalent bonding of the liquid diene rubber and a group derived from the silane coupling agent. When the unmodified or at least partially hydrogenated liquid diene rubber is used in the form of a modified liquid diene rubber (B1) as a result of forming a covalent bond with at least part of the silane coupling agent (C), the modified rubber in the rubber composition of the present invention exhibits a high affinity for silica (D) described later and thus will be concentrated near the silica (D) to highly reinforce the silica (D). Further, such a modified rubber will also contribute to enhancing the compatibility between the silica (D) and the solid rubber (A). Thus, the silica (D) is allowed to be dispersed in the rubber composition in a state that is ideal for a cured product obtained by crosslinking the rubber composition to exhibit enhanced properties. By virtue of the silica (D) being excellently dispersed in the rubber composition, for example, the rubber composition tends to give cured products having higher properties such as durability and vibration insulating properties.

To ensure that the liquid diene rubber (B) will form covalent bonds with the solid rubber (A) and the silane coupling agent (C) more easily, it is desirable that the liquid diene rubber (B) include residual carbon-carbon unsaturated bonds in the conjugated diene units. To make it easier for the liquid diene rubber (B) to form a covalent bond, the silane coupling agent (C) preferably includes a group capable of reacting with a carbon-carbon unsaturated bond derived from the conjugated diene unit. Examples of the groups capable of reacting with a carbon-carbon unsaturated bond present in the conjugated diene unit include thiol group, disulfide group, trisulfide group, tetrasulfide group, epoxy group, vinyl group, acryloyl group and methacryloyl group. Among these groups, thiol group is preferable from points of view such as reactivity. In a preferred embodiment, such a silane coupling agent (C) is a silane compound represented by the following formula (1) (hereinafter, also written as the silane compound (1)).

[Chem. 1]

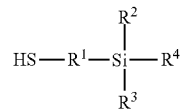

(1)

In the formula (1), $R^1$ is a C1-C6 divalent alkylene group. Examples of the C1-C6 divalent alkylene groups include methylene group, ethylene group, propylene group, butylene group, pentylene group and hexylene group. $R^2$, $R^3$ and $R^4$ are each independently a methoxy group, an ethoxy group, a phenoxy group, a methyl group, an ethyl group or a phenyl group, with the proviso that at least one of $R^2$, $R^3$ and $R^4$ is a methoxy group, an ethoxy group or a phenoxy group.

Examples of the silane compounds (1) include mercaptomethylenemethyldiethoxysilane, mercaptomethylenetriethoxysilane, 2-mercaptoethyltrimethoxysilane, 2-mercaptoethyltriethoxysilane, 2-mercaptoethylmethoxydimethylsilane, 2-mercaptoethylethoxydimethylsilane, 3-mercaptopropyltrimethoxysilane, 3-mercaptopropyltriethoxysilane, 3-mercaptopropyldimethoxymethylsilane, 3-mercaptopropyldiethoxymethylsilane, 3-mercaptopropyldimethoxyethylsilane, 3-mercaptopropyldiethoxyethylsilane, 3-mercaptopropylmethoxydimethylsilane and 3-mercaptopropylethoxydimethylsilane. The silane compounds may be used singly, or two or more may be used in combination.

Other silane compounds may be also used as the silane coupling agents (C), with examples including bis(3-triethoxysilylpropyl) tetrasulfide, bis(2-triethoxysilylethyl) tetrasulfide, bis(3-trimethoxysilylpropyl) tetrasulfide, bis(2-trimethoxysilylethyl) tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-trimethoxysilylethyl-N,N-dimethylthiocarbamoyl tetrasulfide, 3-trimethoxysilylpropylbenzothiazole tetrasulfide, 3-triethoxysilylpropylbenzothiazole tetrasulfide, bis(3-triethoxysilylpropyl) trisulfide, bis(3-trimethoxysilylpropyl) trisulfide, bis(3-triethoxysilylpropyl) disulfide, and bis(3-trimethoxysilylpropyl) disulfide.

The mercapto group (—SH) of the silane compound (1) is radically added to a carbon-carbon unsaturated bond that is preferably present in the conjugated diene unit in the liquid diene rubber (B). The reaction results in a modified liquid diene rubber (B1A) that has the functional group derived from the silane compound (1), specifically, a functional group that is the partial structure represented by the following formula (2):

[Chem. 2]

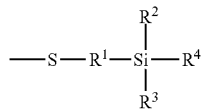

(2)

Details such as the definitions and specific examples of $R^1$, $R^2$, $R^3$ and $R^4$ in the formula (2) are the same as those of $R^1$, $R^2$, $R^3$ and $R^4$ in the formula (1).

The average number of the functional groups derived from the silane compound (1) per molecule of the modified liquid diene rubber (B1A) is 1 to 30, preferably 1 to 25, more preferably 1 to 20, still more preferably 1 to 15, further preferably 1 to 10, and particularly preferably 1 to 9. If the average number of the functional groups is less than 1, the rubber exhibits a low affinity for silica (D) described later and cured products obtained by crosslinking such a rubber composition may fail to attain the desired enhancements in properties. If, on the other hand, the average number of the functional groups is more than 30, cured products obtained from the rubber composition do not attain the desired enhancements in properties and tend to be deteriorated in properties. Although detailed mechanisms are not clear, it is probable that the modified liquid diene rubber (B1A) can be concentrated near the silica (D) more easily as a result of the introduction of an appropriate amount of the functional groups in the modified liquid diene rubber (B1A), and this facilitated access leads to enhanced properties of cured products that are obtained. Further, the modified liquid diene rubber (B1A) probably mediates the enhancement in affinity between the solid rubber (A) and the silica (D) to allow the silica (D) to be dispersed in the rubber composition in a state that is ideal for a cured product to exhibit enhanced properties. That is, for example, dispersibility is improved. If, on the other hand, the modified liquid diene rubber contains too many functional groups, the molecules of the modified liquid diene rubber adsorbed to the silica (D) come to interact with one another so strongly that the silica (D) is not allowed to be dispersed in the rubber composition in a state that is ideal for a cured product to exhibit enhanced properties, for example, the silica (D) is aggregated in some cases. Such an excessively modified liquid diene rubber will not contribute to enhancing the affinity between the solid rubber (A) and the silica (D). To obtain cured products enhanced in durability and vibration insulating properties, the average number of the functional groups derived from the silane compound (1) per molecule of the modified liquid diene rubber (B1A) is preferably 1 to 9.

The average number of the functional groups per molecule of the modified liquid diene rubber (B1A) may be calculated from the functional group equivalent weight (g/eq) and the styrene-equivalent number average molecular weight Mn of the modified liquid diene rubber (B1A).

(Average number of functional groups per molecule)= [(Number average molecular weight Mn)/(Molecular weight of styrene unit)×(Average molecular weight of units from conjugated diene and optional monomers other than conjugated dienes)]/(Functional group equivalent weight)

The functional group equivalent weight of the modified liquid diene rubber (B1A) indicates the mass of the conjugated diene and optional additional monomers other than conjugated dienes that are bonded together per one functional group. The functional group equivalent weight may be calculated from the ratio of the area of the peak assigned to the polymer main chains to the area of the peak assigned to the functional groups using $^1$H-NMR or $^{13}$C-NMR. The peak assigned to the functional groups is a peak assigned to alkoxy groups.

The amount of the silane compound (1) added in the modified liquid diene rubber (B1A) is preferably 1 to 60 parts by mass per 100 parts by mass of the unmodified or at least partially hydrogenated liquid diene rubber, and is more preferably 1 to 50 parts by mass, still more preferably 1 to 40 parts by mass, and particularly preferably 1 to 30 parts by mass. If the amount of the modifying agent added is larger than 60 parts by mass, the dispersibility of the silica (D) tends not to be effectively improved, and cured products that are obtained tend to fail to attain the desired enhancements in properties. If the amount is less than 1 part by mass, the dispersibility of the silica (D) tends not to be effectively improved and the silica (D) tends not to be dispersed in a state that is ideal for a cured product to attain enhanced properties. The amount of the silane compound (1) added in the modified liquid diene rubber (B1A) may be determined with various analyzers such as, for example, a nuclear magnetic resonance spectrometer.

The liquid diene rubber (B) that is used may be a modified liquid diene rubber (B1) obtained by positively reacting a modifier, for example, a silane coupling agent (C) such as a silane compound (1), on the unmodified or at least partially hydrogenated liquid diene rubber. In this case, the modifier such as the silane coupling agent (C) may be added by any method without limitation. For example, the modifier, for example, the silane coupling agent (C) such as the silane compound (1), and optionally a radical catalyst as required may be added to the liquid diene rubber, and the mixture may be heated in the presence of or without an organic solvent. The radical generator that is used is not particularly limited and may be any of, among others, organic peroxides, azo compounds and hydrogen peroxide that are usually available in the market.

Examples of the organic peroxides include methyl ethyl ketone peroxide, cyclohexanone peroxide, 3,3,5-trimethylcyclohexanone peroxide, methylcyclohexanone peroxide, acetylacetone peroxide, 1,1-bis(t-butylperoxy)-3,3,5-trimethylcyclohexane, 1,1-bis(t-butylperoxy)cyclohexane, 1,1-bis(t-hexylperoxy)cyclohexane, 2,2-bis(t-butylperoxy)butane, t-butylhydroperoxide, cumenehydroperoxide, diisopropylbenzene hydroperoxide, p-menthane hydroperoxide, 2,5-dimethylhexane 2,5-dihydroperoxide, 1,1,3,3-tetramethylbutyl hydroperoxide, di-t-butyl peroxide, t-butylcumyl peroxide, dicumyl peroxide, bis(t-butylperoxyisopropyl)benzene, 2,5-dimethyl-2,5-di(t-butylperoxy)hexane, 2,5-hexanoyl peroxide, lauroyl peroxide, succinic acid peroxide, benzoyl peroxide and derivatives thereof, 2,4-dichlorobenzoyl peroxide, m-toluoyl peroxide, diisopropyl peroxydicarbonate, t-butyl-2-ethyl hexanoate, di-2-ethylhexyl peroxydicarbonate, dimethoxyisopropyl peroxycarbonate, di(3-methyl-3-methoxybutyl) peroxydicarbonate, t-butyl peroxyacetate, t-butyl peroxyivalate, t-butyl peroxyneodecanoate, t-butyl peroxyoctanoate, t-butyl peroxy-3,3,5-trimethylhexanoate, t-butyl peroxylaurate, t-butyl peroxycarbonate, t-butyl peroxybenzoate and t-butyl peroxyisobutyrate.

Examples of the azo compounds include 2,2'-azobisisobutyronitrile, 1,1'-azobis(cyclohexane-1-carbonitrile), 2,2'-azobis(2-methylbutyronitrile), 2,2'-azobis(2,4-dimethylvaleronitrile), 2,2'-azobis(2,4-dimethyl-4-methoxyvaleronitrile), 2,2'-azobis(2-(2-imidazolin-2-yl)propane), 2,2'-azobis(2,4,4-trimethylpentane), 2,2'-azobis(2-methylpropane), 2,2'-azobis(2-hydroxymethylpropionitrile), 4,4'-azobis(4-cyanovaleric acid), dimethyl 2,2'-azobis(2-methylpropionate), 2-cyano-2-propylazoformamide and 2-phenylazo-4-methoxy-2,4-dimethylvaleronitrile.

Examples of the organic solvents which are generally used in the above method include hydrocarbon solvents and halogenated hydrocarbon solvents. Of the organic solvents, hydrocarbon solvents such as n-butane, n-hexane, n-heptane, cyclohexane, benzene, toluene and xylene are preferable.

For purposes such as to suppress side reactions during the addition reaction of the modifying agent by the aforementioned method, an antioxidant may be added.

Some preferred examples of the antioxidants used for such purposes include 2,6-di-t-butyl-4-methylphenol (BHT), 2,2'-methylenebis(4-methyl-6-t-butylphenol), 4,4'-thiobis(3-methyl-6-t-butylphenol), 4,4'-butylidenebis(3-methyl-6-t-butylphenol) (AO-40), 3,9-bis[1,1-dimethyl-2-[3-(3-t-butyl-4-hydroxy-5-methylphenyl)propionyloxy]ethyl]-2,4,8,10-tetraoxaspiro[5.5]undecane (AO-80), 2,4-bis[(octylthio)methyl]-6-methylphenol (Irganox 1520L), 2,4-bis[(dodecylthio)methyl]-6-methylphenol (Irganox 1726), 2-[1-(2-hydroxy-3,5-di-t-pentylphenyl)ethyl]-4,6-di-t-pentylphenyl acrylate (Sumilizer GS), 2-t-butyl-6-(3-t-butyl-2-hydroxy-5-methylbenzyl)-4-methylphenyl acrylate (Sumilizer GM), 6-t-butyl-4-[3-(2,4,8,10-tetra-t-butyldibenzo[d,f][1,3,2]dioxaphosphepin-6-yloxy)propyl]-2-methylphenol (Sumilizer GP), tris(2,4-di-t-butylphenyl) phosphite (Irgafos 168), dioctadecyl 3,3'-dithiobispropionate, hydroquinone, p-methoxyphenol, N-phenyl-N'-(1,3-dimethylbutyl)-p-phenylenediamine (Nocrac 6C), bis(2,2,6,6-tetramethyl-4-piperidyl) sebacate (LA-77Y), N,N-dioctadecylhydroxylamine (Irgastab FS 042) and bis(4-t-octylphenyl)amine (Irganox 5057). The antioxidants may be used singly, or two or more may be used in combination.

The amount in which the antioxidant is added is preferably not more than 10 parts by mass per 100 parts by mass of the unmodified or at least partially hydrogenated liquid diene rubber, and is more preferably 0.1 to 7 parts by mass, and still more preferably 0.5 to 5 parts by mass. When the content of the antioxidant is in the above range, the rubber composition may be crosslinked with no or less vulcanization inhibition, and the cured product (the crosslinked rubber) that is obtained has no or less blooming.

In the modified liquid diene rubber (B1), the functional groups may be introduced at polymer ends or polymer side chains. The introduction sites are preferably polymer side chains in view of the fact that a plurality of functional groups can be introduced easily. The functional groups may belong to a single kind or may be a mixture of two or more kinds. That is, the modified liquid diene rubber (B1) may be modified with a single kind of the modifying agent or with two or more kinds of the modifying agents.

The mixing ratio of the liquid diene rubber (B) to the silane coupling agent (C) such as the silane compound (1) is not particularly limited as long as the mixing ratio with respect to the solid rubber (A) falls in a desired range described later. For example, the liquid diene rubber (B) and the silane coupling agent (C) such as the silane compound (1) may be mixed with each other in a mass ratio (B)/(C) of, for example, 0.3 to 50. The mass ratio (B)/(C) is preferably 0.1 to 50, more preferably 0.1 to 30, still more preferably 0.5 to 20, and particularly preferably 1 to 15. When the content of the silane coupling agent is in the above range, enhancements are obtained in dispersibility, coupling effects, reinforcing properties and abrasion resistance.

When the silane compound (1) is used as the silane coupling agent (C), the silane compound (1) may be effectively radically added by performing the reaction at an appropriate reaction temperature for a sufficient amount of reaction time. For example, the addition reaction of the silane compound (1) to the unmodified or at least partially hydrogenated liquid diene rubber is preferably performed at a temperature of 10 to 200° C., and more preferably 50° C. to 180° C. The reaction time is preferably 1 to 200 hours, more preferably 1 to 100 hours, and still more preferably 1 to 50 hours.

The weight average molecular weight (Mw) of the liquid diene rubber (B) is preferably not less than 1,000 and not more than 80,000, more preferably not less than 2,000 and not more than 60,000, still more preferably not less than 2,000 and not more than 35,000, even more preferably not less than 2,000 and not more than 20,000, and particularly preferably not less than 2,000 and not more than 10,000. This range of the Mw of the liquid diene rubber (B) ensures that the rubber composition of the present invention will attain good processability and that the affinity for silica (D) described later in the obtainable rubber composition will be enhanced and will become ideal for cured products to attain enhanced properties (for example, the rubber will contribute to enhancing the dispersibility of the silica (D)). In the present specification, the Mw of the liquid diene rubber (B) is the weight average molecular weight measured by gel permeation chromatography (GPC) relative to standard polystyrenes. In the present invention, two or more kinds of the liquid diene rubbers (B) having different molecular weights Mw may be used in combination.

The molecular weight distribution (Mw/Mn) of the liquid diene rubber (B) is preferably 1.0 to 20.0, more preferably 1.0 to 15.0, and still more preferably 1.0 to 10.0. This Mw/Mn is advantageous in that the obtainable liquid diene rubber (B) has a small variation in viscosity. The molecular weight distribution (Mw/Mn) is the ratio of weight average molecular weight (Mw) to number average molecular weight (Mn) measured by GPC relative to polystyrene standards.

The melt viscosity of the liquid diene rubber (B) or the modified liquid diene rubber (B1) measured at 38° C. is preferably 0.1 to 4,000 Pa·s, more preferably 0.1 to 3,500 Pa·s, and still more preferably 0.1 to 3,000 Pa·s. When the melt viscosity of the liquid diene rubber (B) is in the above range, the rubber composition that is obtained attains enhanced flexibility and thus exhibits higher processability. In the present invention, the melt viscosity of the liquid diene rubber (B) or the modified liquid diene rubber (B1) is a value measured with a Brookfield viscometer at 38° C.

The glass transition temperature (Tg) of the liquid diene rubber (B) is variable depending on factors such as the vinyl content in the conjugated diene units, the types of the conjugated dienes and the content of units derived from monomers other than conjugated dienes, but is preferably −150 to 50° C., more preferably −130 to 50° C., and still more preferably −100 to 50° C. When the Tg is in this range, the increase in viscosity may be reduced and handling may be facilitated. Further, when the glass transition temperature (Tg) of the liquid diene rubber (B) is −150° C. or above, cured products obtained from the rubber composition will attain enhancements in desired properties and tend to exhibit high durability and good vibration insulating properties.

The vinyl content in the liquid diene rubber (B) is preferably in the range of 99 to 5 mol %, more preferably in the range of 90 to 10 mol %, still more preferably in the range of 80 to 20 mol %, even more preferably in the range of 75 to 25 mol %, and particularly preferably in the range of 70 to 40 mol %. When the vinyl content in the liquid diene rubber (B) is in the above range, the rubber exhibits appropriate co-crosslinkability with the solid rubber, and cured products that are obtained attain an excellent balance between durability and vibration insulating properties. In the present invention, the "vinyl content" means the total molar percentage of 1,2-bonded or 3,4-bonded conjugated diene units (conjugated diene units except 1,4-bonded conjugated diene units) relative to the total of the conjugated diene units in the liquid diene rubber (B) taken as 100 mol %. The vinyl content may be determined by $^1$H-NMR based on the area ratio of the peaks assigned to 1,2-bonded or 3,4-bonded conjugated diene units and the peak assigned to 1,4-bonded conjugated diene units. The vinyl content in the liquid diene rubber (B) may be brought to the desired value by, for example, selecting the types of a solvent and an optional polar compound used in the production of the liquid diene rubber (B), or controlling the production conditions such as polymerization temperature.

The liquid diene rubbers (B) may be used singly, or two or more may be used in combination. When the modified liquid diene rubber (B1) is used as the liquid diene rubber (B), the modified liquid diene rubber (B1) may be in the form of a mixture with a liquid diene rubber (B) other than the modified liquid diene rubbers (B1) (for example, a component present as part of the liquid diene rubber (B), such as an unmodified liquid diene rubber, or a liquid diene rubber that is free from any modifying agents or the like and is at least partially hydrogenated).

In the liquid diene rubber (B), the catalyst residue content ascribed to the polymerization catalyst used in the production of the rubber is preferably in the range of 0 to 200 ppm in terms of metal. When, for example, the polymerization catalyst used for the production of the liquid diene rubber (B) is an organoalkali metal such as an organolithium compound, the metal based on which the catalyst residue content is determined is the alkali metal such as lithium. The catalyst residue content in the above range ensures that a decrease in tackiness during processing or the like will be avoided and that cured products obtained from the rubber composition of the present invention will be enhanced in durability. The catalyst residue content ascribed to the polymerization catalyst used in the production of the liquid diene rubber (B) is more preferably 0 to 150 ppm, and still more preferably 0 to 100 ppm in terms of metal. The catalyst residue content may be measured with, for example, a polarized Zeeman atomic absorption spectrophotometer.

For example, the catalyst residue content in the liquid diene rubber (B) may be controlled to the above specific range by purifying the as-produced liquid diene rubber to remove sufficiently the catalyst residue. The purification method is preferably washing with water or warm water, an organic solvent such as methanol or acetone, or supercritical fluid carbon dioxide. From the economic viewpoint, the number of washing operations is preferably 1 to 20 times, and more preferably 1 to 10 times. The washing temperature is preferably 20 to 100° C., and more preferably 40 to 90° C. Prior to the polymerization reaction, the monomers may be purified by distillation or with an adsorbent to remove impurities that will inhibit the polymerization. Such purification allows the polymerization to take place with a reduced amount of the polymerization catalyst, thus making it possible to reduce the catalyst residue content. From the similar viewpoint, the catalyst residue content in the rubber composition of the present invention is preferably 0 to 200 ppm, more preferably 0 to 150 ppm, and still more preferably 0 to 100 ppm in terms of metal. In this case, the catalyst residue content may include a catalyst residue content ascribed to the polymerization catalyst used in the production of the solid rubber (A), the liquid diene rubber (B) and/or other components optionally used in the rubber composition.

In the rubber composition of the present invention, the content of the liquid diene rubber (B) with respect to 100 parts by mass of the solid rubber (A) is preferably 0.1 to 50 parts by mass, more preferably 0.1 to 45 parts by mass, still more preferably 0.5 to 40 parts by mass, even more preferably 0.5 to 35 parts by mass, further preferably 1 to 30 parts by mass, furthermore preferably 1 to 25 parts by mass, particularly preferably 2 to 20 parts by mass, and most preferably 3 to 12 parts by mass. When the content of the liquid diene rubber (B) is in the above range, the silica (D) is allowed to be dispersed in the rubber composition in an ideal state, and cured products that are obtained attain enhancements in durability and vibration insulating properties.

[Silane Coupling Agents (C)]

The rubber composition of the present invention includes a silane coupling agent (C). The rubber composition of the present invention can give cured products excellent in durability and vibration insulating properties by virtue of the combined use of the liquid diene rubber (B) and the silane coupling agent (C) in addition to silica (D) having specific properties that is described later. Examples of the silane coupling agents (C) used in the present invention include mercapto compounds, sulfide compounds, vinyl compounds, amino compounds, glycidoxy compounds, nitro compounds and chloro compounds.

Examples of the mercapto compounds include the silane compounds (1) described hereinabove and those compounds described as specific examples thereof.

Examples of the sulfide compounds include bis(3-triethoxysilylpropyl) tetrasulfide, bis(2-triethoxysilylethyl) tetrasulfide, bis(3-trimethoxysilylpropyl) tetrasulfide, bis(2-trimethoxysilylethyl) tetrasulfide, bis(3-triethoxysilylpropyl) trisulfide, bis(3-trimethoxysilylpropyl) trisulfide, bis(3-triethoxysilylpropyl) disulfide, bis(3-trimethoxysilylpropyl) disulfide, 3-trimethoxysilylpropyl-N,N-dimethylthiocarbamoyl tetrasulfide, 3-triethoxysilylpropyl-N,N-dimethylthiocarbamoyl tetrasulfide, 2-trimethoxysilylethyl-N,N-dimethylthiocarbamoyl tetrasulfide, 3-trimethoxysilylpropyl benzothiazole tetrasulfide, 3-triethoxysilylpropyl benzothiazole tetrasulfide, 3-triethoxysilylpropyl methacrylate monosulfide, 3-trimethoxysilylpropyl methacrylate monosulfide and 3-octanoylthio-1-propyltriethoxysilane.

Examples of the vinyl compounds include vinyltriethoxysilane and vinyltrimethoxysilane.

Examples of the amino compounds include 3-aminopropyltriethoxysilane, 3-aminopropyltrimethoxysilane, 3-(2-aminoethyl)aminopropyltriethoxysilane and 3-(2-aminoethyl)aminopropyltrimethoxysilane.

Examples of the glycidoxy compounds include γ-glycidoxypropyltriethoxysilane, γ-glycidoxypropyltrimethoxysilane, γ-glycidoxypropylmethyldiethoxysilane and γ-glycidoxypropylmethyldimethoxysilane.

Examples of the nitro compounds include 3-nitropropyltrimethoxysilane and 3-nitropropyltriethoxysilane.

Examples of the chloro compounds include 3-chloropropyltrimethoxysilane, 3-chloropropyltriethoxysilane, 2-chloroethyltrimethoxysilane and 2-chloroethyltriethoxysilane.

Other compounds may be also used, with examples including octyltriethoxysilane, methyltriethoxysilane, methyltrimethoxysilane and hexadecyltrimethoxysilane.

To reliably attain the desired enhancements in properties, a mercapto compound is preferably included as the silane coupling agent (C), and a silane compound (1) is more preferably included as the silane coupling agent (C).

The silane coupling agents (C) may be used singly, or two or more may be used in combination.

The content of the silane coupling agent (C) is preferably 0.1 to 30 parts by mass, more preferably 0.5 to 20 parts by mass, and still more preferably 1 to 15 parts by mass with respect to 100 parts by mass of silica (D) described later. This range of the content of the silane coupling agent ensures that the dispersibility of silica in the rubber composition will be improved, and further that the interfacial strength between the silica and the rubber composition is enhanced and consequently the obtainable cured products attain enhanced durability and vibration insulating properties.

[Silicas (D)]

The rubber composition of the present invention includes silica (D) having a BET specific surface area of 15 to 250 $m^2/g$. The incorporation of the silica (D) having this predetermined specific surface area allows for concurrent enhancements in durability and vibration insulating properties of cured products that are obtained. To enhance handling properties and to further enhance the durability and vibration insulating properties of cured products that are obtained, the BET specific surface area of the silica (D) is preferably 30 to 250 $m^2/g$, more preferably 30 to 200 $m^2/g$, still more preferably 40 to 200 $m^2/g$, even more preferably 50 to 200 $m^2/g$, particularly preferably 60 to 200 $m^2/g$, and most preferably 70 to 200 $m^2/g$. The BET specific surface area of the silica (D) may be determined by a nitrogen gas adsorption method.

Examples of the silicas (D) include wet silicas (hydrous silicates), dry silicas (silicic anhydrides), calcium silicates and aluminum silicates. Among these silicas, wet silicas are preferable to attain further enhancements in processability, mechanical strength and abrasion resistance. The silicas (D) may be used singly, or two or more may be used in combination.

To attain enhancements in processability and in the durability and vibration insulating properties of cured products that are obtained, the average particle diameter of the silica (D) is preferably 0.5 to 200 nm, more preferably 5 to 150 nm, and still more preferably 10 to 100 nm. The average particle diameter of the silica may be determined by measuring the diameters of the particles with a transmission electron microscope and calculating the average of the diameters.

In the rubber composition of the present invention, the content of the silica (D) with respect to 100 parts by mass of the solid rubber (A) is 10 to 100 parts by mass, preferably 10 to 90 parts by mass, and more preferably 20 to 70 parts by mass. When the content of the silica (D) is in the above range, further enhancements are attained in processability and in the durability and vibration insulating properties of cured products that are obtained. If the content of the silica (D) is less than 10 parts by mass, sufficient reinforcing effects are not obtained, and mechanical strength and durability are lowered. If the content is more than 100 parts by mass, the dynamic-to-static modulus ratio is deteriorated due to the occurrence of silica agglomerates, and vibration insulating properties tend to be lowered.

[Additional Components]

The rubber composition of the present invention may include a filler other than the silicas (D). Examples of the fillers other than the silicas (D) include inorganic fillers such as carbon blacks, clays, micas, calcium carbonate, magnesium hydroxide, aluminum hydroxide, barium sulfate, titanium oxides, glass fibers, fibrous fillers and glass balloons; and organic fillers such as resin particles, wood powders and cork powders. By adding such fillers to the rubber composition, it is possible to improve properties such as mechanical strength, heat resistance and weather resistance, to control the hardness, and to increase the bulkiness of the rubber. Among the above fillers, carbon blacks are preferable from points of view such as improvements in properties, for example, enhancements in mechanical strength.

Examples of the carbon blacks include furnace blacks, channel blacks, thermal blacks, acetylene blacks and Ketjen blacks. From the points of view of enhancing the crosslinking rate and enhancing the mechanical strength, furnace blacks are preferable among the above carbon blacks. The carbon blacks may be used singly, or two or more may be used in combination.

To attain enhancements in properties such as dispersibility, mechanical strength and hardness, the average particle diameter of the carbon black is preferably 5 to 100 nm, more preferably 5 to 80 nm, and still more preferably 5 to 70 nm. The average particle diameter of the carbon black may be determined by measuring the diameters of the particles with a transmission electron microscope and calculating the average of the diameters.

Examples of the commercially available furnace blacks include "DIABLACK" manufactured by Mitsubishi Chemical Corporation and "SEAST" manufactured by Tokai Carbon Co., Ltd. Examples of the commercially available acetylene blacks include "DENKA BLACK" manufactured by Denka Company Limited. Examples of the commercially available Ketjen blacks include "ECP600JD" manufactured by Lion Specialty Chemicals Co., Ltd.

To attain enhancements in properties such as the wettability and dispersibility with respect to the solid rubber (A), the carbon black may be treated with an acid such as nitric acid, sulfuric acid, hydrochloric acid or a mixture of these acids, or may be subjected to surface oxidation treatment by heating in the presence of air. To enhance the mechanical strength of the rubber composition of the present invention and of cured products obtained by crosslinking the composition, the carbon black may be heat treated at 2,000 to 3,000° C. in the presence of a graphitization catalyst. Preferred examples of the graphitization catalysts include boron, boron oxides (for example, $B_2O_2$, $B_2O_3$, $B_4O_3$ and $B_4O_5$), boron oxoacids (for example, orthoboric acid, metaboric acid and tetraboric acid) and salts thereof, boron carbides (for example, $B_4C$ and $B_6C$), boron nitride (BN) and other boron compounds.

The carbon black may be used after its grain size is controlled by a technique such as crushing. Examples of the grinders which may be used for the crushing of the carbon blacks include high-speed rotary crushers (hammer mills, pin mills and cage mills), various ball mills (rotary mills, vibration mills and planetary mills) and stirring mills (bead mills, Attritor mills, flow tube type mills and annular mills).

In the rubber composition of the present invention, the content of the carbon black with respect to 100 parts by mass of the solid rubber (A) is preferably not more than 200 parts by mass, more preferably not more than 180 parts by mass, and still more preferably not more than 150 parts by mass. This range of the content of the carbon black ensures that processability, mechanical strength and abrasion resistance will be enhanced.

When a filler other than the carbon blacks is used as the additional filler other than the silicas (D), the content thereof is preferably not more than 120 parts by mass, more preferably not more than 90 parts by mass, and still more preferably not more than 80 parts by mass per 100 parts by mass of the solid rubber (A).

These fillers other than the silicas (D) may be used singly, or two or more may be used in combination.

The rubber composition of the present invention may further include a crosslinking agent for crosslinking the rubber components. Examples of the crosslinking agents include sulfur, sulfur compounds, oxygen, organic peroxides, phenolic resins, amino resins, quinone and quinone dioxime derivatives, halogen compounds, aldehyde compounds, alcohol compounds, epoxy compounds, metal halides and organometal halides, and silane compounds. Examples of the sulfur compounds include morpholine disulfides and alkylphenol disulfides. Examples of the organic peroxides include cyclohexanone peroxide, methyl acetoacetate peroxide, t-butyl peroxyisobutyrate, t-butyl peroxybenzoate, benzoyl peroxide, lauroyl peroxide, dicumyl peroxide, di-t-butyl peroxide and 1,3-bis(t-butylperoxyisopropyl)benzene.

Among the above crosslinking agents, organic peroxides capable of peroxide crosslinking are preferable from the points of view of the heat resistance and the balance between durability and vibration insulating properties of cured products. From the similar viewpoints and also from the point of view of versatility, those peroxides having a structure represented by the formula (3) below are more preferable.

The crosslinking agents may be used singly, or two or more may be used in combination. From the point of view of the mechanical properties of cured products, the crosslinking agent is usually added in an amount of 0.1 to 10 parts by mass, preferably 0.5 to 10 parts by mass, and more preferably 0.8 to 5 parts by mass per 100 parts by mass of the solid rubber (A).

[Chem. 3]

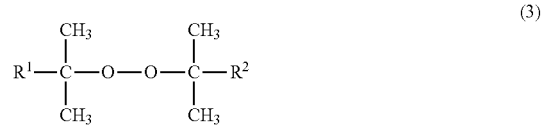

(3)

In the formula (3), $R^1$ and $R^2$ are each a substituted or unsubstituted, linear or branched alkyl group having 1 to 5 carbon atoms, or a substituted or unsubstituted, monovalent aromatic hydrocarbon group having 6 to 10 carbon atoms.

When, for example, the rubber composition of the present invention includes sulfur, a sulfur compound or the like, the rubber composition may further contain a vulcanization accelerator. Examples of the vulcanization accelerators include guanidine compounds, sulfenamide compounds, thiazole compounds, thiuram compounds, thiourea compounds, dithiocarbamic acid compounds, aldehyde-amine compounds, aldehyde-ammonia compounds, imidazoline compounds and xanthate compounds. The vulcanization accelerators may be used singly, or two or more may be used in combination. The vulcanization accelerator is usually added in an amount of 0.1 to 15 parts by mass, and preferably 0.1 to 10 parts by mass per 100 parts by mass of the solid rubber (A).

When, for example, the rubber composition of the present invention includes sulfur, a sulfur compound or the like, the rubber composition may further contain a vulcanization aid. Examples of the vulcanization aids include fatty acids such as stearic acid, metal oxides such as zinc oxide, and fatty acid metal salts such as zinc stearate. The vulcanization aids may be used singly, or two or more may be used in combination. The vulcanization aid is usually added in an amount of 0.1 to 15 parts by mass, and preferably 1 to 10 parts by mass per 100 parts by mass of the solid rubber (A).

Where necessary, the rubber composition of the present invention may include a softener in order to attain improvements in properties such as processability and fluidity while still ensuring that the advantageous effects of the invention are not impaired. Examples of the softeners include process oils such as silicone oils, aromatic oils, TDAEs (treated distilled aromatic extracts), MESs (mild extracted solvates), RAEs (residual aromatic extracts), paraffin oils and naphthenic oils, and resin components such as aliphatic hydrocarbon resins, alicyclic hydrocarbon resins, C9 resins, rosin resins, coumarone-indene resins and phenolic resins. When the rubber composition of the present invention contains the process oil as the softener, the content thereof from the point of view of ensuring good processability is preferably 1 to not more than 50 parts by mass, and more preferably 1 to 50 parts by mass per 100 parts by mass of the solid rubber (A).

The rubber composition of the present invention may contain additives as required in order to attain enhancements in properties such as weather resistance, heat resistance and oxidation resistance, while still achieving the advantageous effects of the invention. Examples of such additives include antioxidants, waxes, oxidation inhibitors, lubricants, light stabilizers, scorch inhibitors, processing aids, colorants such as pigments and coloring matters, flame retardants, antistatic agents, matting agents, antiblocking agents, UV absorbers, release agents, foaming agents, antibacterial agents, mildew-proofing agents and perfumes.

Examples of the flame retardants include inorganic filler-based flame retardants such as aluminum hydroxide, magnesium hydroxide, calcium hydroxide, calcium sulfate hydrate and magnesium sulfate hydrate. In particular, aluminum hydroxide is preferable because of its higher flame retardancy. The flame retardants may be used singly, or two or more may be used in combination.

Examples of the oxidation inhibitors include hindered phenol compounds, phosphorus compounds, lactone compounds and hydroxyl compounds. Examples of the antioxidants include amine-ketone compounds, imidazole compounds, amine compounds, phenolic compounds, sulfur compounds and phosphorus compounds.

The additives may be used singly, or two or more may be used in combination.

[Methods for Producing Rubber Compositions]

The rubber composition of the present invention may be produced by any methods without limitation as long as the components described hereinabove can be mixed together homogeneously. Examples of the apparatuses used in the production of the rubber composition include tangential or intermeshing internal kneaders such as kneader-ruders, Brabender mixers, Banbury mixers and internal mixers, single-screw extruders, twin-screw extruders, mixing rolls and rollers. The production of the rubber composition may be usually carried out at a temperature in the range of 70 to 270° C.

[Cured Products]

A cured product may be obtained by crosslinking the rubber composition of the present invention. The conditions for the crosslinking of the rubber composition may be selected appropriately in accordance with the use application or other factors.

When, for example, the rubber composition including sulfur or a sulfur compound as a crosslinking agent is crosslinked (vulcanized) in a mold, the crosslinking temperature may be usually 120 to 200° C. and the pressure conditions during the crosslinking (vulcanization) may be usually 0.5 to 2.0 MPa.

When the rubber composition including an organic peroxide as a crosslinking agent is crosslinked in a mold, the crosslinking temperature may be usually 100 to 200° C. and the pressure conditions during the crosslinking may be usually 0.5 to 2.0 MPa.

The cured product of the rubber composition of the present invention can concurrently achieve high levels of vibration insulating properties and durability, and thus may be suitably used as a member requiring vibration insulating properties, for example, a rubber vibration insulator. Such rubber vibration insulators may be suitably used as, for example, vibration insulating materials such as engine mounts, stabilizer bushes and suspension bushes used in automobiles, other vehicles and the like, vibration absorbing dampers for electronic devices and home appliances, and members of vibration absorbing/seismic isolating devices for building materials. In addition to these applications, the cured products of the rubber composition of the present invention may be suitably used in rolls, conveyor belts, shoes and the like.

When the rubber composition of the present invention includes a flame retardant, the rubber composition may be used more favorably in the applications described above, namely, as vibration insulating materials used in automobiles, other vehicles and the like, as vibration absorbing dampers for electronic devices and home appliances, and as members of vibration absorbing/seismic isolating devices for building materials.

EXAMPLES

Hereinbelow, the present invention will be described in greater detail based on Examples. However, it should be construed that the scope of the present invention is not limited to such Examples.

The components used in Examples and Comparative Examples are as follows.

<Solid Rubbers (A)>
EPDM (A-1): ESPRENE 512F (manufactured by Sumitomo Chemical Co., Ltd.)
NR (A-2): STR-20 (manufactured by VON BUNDIT Co., Ltd.)
<Liquid Diene Rubber (B)>
Liquid diene rubber (B-1) obtained in Production Example 1 described later
<Modified Liquid Diene Rubbers (B1)>
Modified liquid diene rubbers (B1-1), (B1-2), (B1-3) and (B1-4) obtained in Production Examples 2 to 5 described later
<Silane Coupling Agent (C)>
Silane coupling agent (C-1): Si-75 (manufactured by Evonik Degussa Japan)
<Silicas (D)>
Wet silica (D-1): ULTRASIL 7000GR (manufactured by Evonik Degussa Japan), BET specific surface area: 175 $m^2/g$, average particle diameter: 14 nm
Wet silica (D-2): ULTRASIL 360 (manufactured by Evonik Degussa Japan), BET specific surface area: 55 $m^2/g$, average particle diameter: 38 nm
Wet silica (D'-1): SFP-30M (manufactured by Denka Company Limited), BET specific surface area: 6.2 $m^2/g$
<Optional Components>
Oil (1): DIANA PROCESS OIL PW-90 (manufactured by Idemitsu Kosan Co., Ltd.)
Peroxide (1): Perbutyl D (manufactured by NOF CORPORATION)
Peroxide (2): Dicumyl peroxide, 40% purity, diluted with calcium carbonate (manufactured by Tokyo Chemical Industry Co., Ltd.)
Antioxidant (1): NOCRAC 6C (manufactured by OUCHI SHINKO CHEMICAL INDUSTRIAL CO., LTD.)

Production Example 1: Liquid Diene Rubber (B-1)

A thoroughly dried 5 L autoclave was purged with nitrogen and was charged with 1122 g of hexane and 178 g of n-butyllithium (a 17 mass % hexane solution). The temperature was increased to 50° C. While performing stirring, 12 g of N,N,N',N'-tetramethylethylenediamine and 1300 g of butadiene were sequentially added, and polymerization was performed for 1 hour while controlling the polymerization temperature at 50° C. Thereafter, methanol was added to terminate the polymerization reaction. A polymer solution was thus obtained. Water was added to the polymer solution obtained, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford an unmodified liquid diene rubber (B-1) which was a butadiene homopolymer.

Production Example 2: Modified Liquid Diene Rubber (B1-1)

A 1 L volume autoclave was charged with 550 g of the unmodified liquid diene rubber (B-1) obtained in Production Example 1 and was deaerated with nitrogen while performing stirring at 60° C. for 3 hours. There were added 3.9 g of 2,2'-azobis(2-methylbutyronitrile) and 87 g of (3-mercaptopropyl)triethoxysilane. The reaction was performed at 80° C. for 24 hours to give a modified liquid diene rubber (B1-1).

Production Example 3: Modified Liquid Diene Rubber (B1-2)

A thoroughly dried 5 L autoclave was purged with nitrogen and was charged with 1266 g of hexane and 34 g of n-butyllithium (a 17 mass % hexane solution). The temperature was increased to 50° C. While performing stirring, 1300 g of butadiene was sequentially added, and polymerization was performed for 1 hour while controlling the polymerization temperature at 50° C. Thereafter, methanol was added to terminate the polymerization reaction. A polymer solution was thus obtained. Water was added to the polymer solution obtained, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford an unmodified liquid diene rubber (B-2) which was a butadiene homopolymer. Subsequently, a 1 L volume autoclave was charged with 550 g of the unmodified liquid diene rubber (B-2) obtained above and was deaerated with nitrogen while performing stirring at 60° C. for 3 hours. There were added 3.9 g of 2,2'-azobis(2-methylbutyronitrile) and 37 g of (3-mercaptopropyl)triethoxysilane. The reaction was performed at 80° C. for 24 hours to give a modified liquid diene rubber (B1-2).

Production Example 4: Production of Modified Liquid Diene Rubber (B1-3)

A thoroughly dried 5 L autoclave was purged with nitrogen and was charged with 1860 g of cyclohexane and 57 g of s-butyllithium (1.1 mol/L, cyclohexane solution). The temperature was increased to 50° C. While performing stirring, 5.8 g of tetrahydrofuran was added, and then 116 g of butadiene, 1087 g of isoprene and 83 g of butadiene were sequentially added and polymerized while controlling the polymerization temperature at 50° C. Thereafter, methanol was added to terminate the polymerization reaction. A polymer solution was thus obtained. Water was added to the polymer solution obtained, and the mixture was stirred to wash the polymer solution with water. The stirring was terminated. After the liquid had separated into the polymer solution phase and the aqueous phase, the water was removed. After the completion of washing, the polymer solution was dried at 140° C. for 3 hours to afford an unmodified liquid diene rubber (B-3) which was a linear triblock copolymer composed of butadiene homopolymer block-isoprene homopolymer block-butadiene homopolymer block. Subsequently, a 1 L volume autoclave was charged with 490 g of the unmodified liquid diene rubber (B-3) obtained above and was deaerated with nitrogen while performing stirring at 60° C. for 3 hours. There were added 2.5 g of 1,1-bis(t-hexylperoxy)cyclohexane and 29 g of (3-mercaptopropyl)triethoxysilane. The reaction was performed at 105° C. for 8 hours to give a modified liquid diene rubber (B1-3) which was a linear triblock copolymer composed of butadiene homopolymer block-isoprene homopolymer block-butadiene homopolymer block.

Production Example 5: Production of Modified Liquid Diene Rubber (B1-4)

A thoroughly dried 5 L autoclave was purged with nitrogen and was charged with 1860 g of cyclohexane and 61 g of s-butyllithium (1.0 mol/L, cyclohexane solution). The temperature was increased to 50° C. While performing stirring, 5.8 g of tetrahydrofuran was added, and thereafter 1286 g of a mixture of butadiene and isoprene prepared beforehand (by mixing 166 g of butadiene and 1120 g of isoprene in a tank) was sequentially added and polymerized while controlling the polymerization temperature at 50° C. Thereafter, methanol was added to terminate the polymerization reaction. A polymer solution was thus obtained. Water was added to the polymer solution obtained, and the mixture was stirred to wash the polymer solution with water. The stirring was terminated. After the liquid had separated into the polymer solution phase and the aqueous phase, the water was removed. After the completion of washing, the polymer solution was dried at 140° C. for 3 hours to afford an unmodified liquid diene rubber (B-4) which was an isoprene/butadiene random copolymer. Subsequently, a 1 L volume autoclave was charged with 505 g of the liquid diene rubber (B-4) obtained above and was deaerated with nitrogen while performing stirring at 60° C. for 3 hours. There were added 3.7 g of 1,1-bis(t-hexylperoxy)cyclohexane and 30 g of (3-mercaptopropyl)triethoxysilane. The reaction was performed at 105° C. for 8 hours to give a modified liquid diene rubber (B1-4) which was an isoprene/butadiene random copolymer.

Properties of the liquid diene rubber and other materials obtained in Production Examples were measured and calculated by the following methods.

(Method for Measuring Weight Average Molecular Weight)

The Mw of the liquid diene rubbers (B) was measured by GPC relative to standard polystyrenes. The measurement involved the following apparatus and conditions.

Apparatus: GPC apparatus "HLC-8320GPC" manufactured by TOSOH CORPORATION
    Separation column: "TSKgel Super HZ4000" column manufactured by TOSOH CORPORATION
    Eluent: Tetrahydrofuran
    Eluent flow rate: 0.7 mL/min
    Sample concentration: 5 mg/10 mL
    Column temperature: 40° C.

(Vinyl Content)

The vinyl content in the liquid diene rubbers (B) was measured with $^1$H-NMR (500 MHz) manufactured by JEOL Ltd. The concentration was sample/deuterated chloroform=50 mg/1 mL. The number of scans was 1024. With respect to the spectrum obtained, the vinyl content was calculated from the ratio of the area of the double-bond peak assigned to the vinylated diene compound to the area of the double-bond peak assigned to the non-vinylated diene compound.

(Glass Transition Temperature)

A 10 mg portion of the liquid diene rubber (B) was placed into an aluminum pan and was analyzed by differential scanning calorimetry (DSC) at a heat-up rate of 10° C./min. With respect to the thermogram obtained, the peak top value of the DDSC curve was adopted as the glass transition temperature Tg.

(Method for Measuring Melt Viscosity at 38° C.)

The melt viscosity of the liquid diene rubbers (B) at 38° C. was measured with a Brookfield viscometer (manufactured by BROOKFIELD ENGINEERING LABS. INC.).

(Average Number of Functional Groups Per Molecule of Modified Liquid Diene Rubber (B1))

The average number of functional groups per molecule of the modified liquid diene rubber (B1) may be calculated from the functional group equivalent weight (g/eq) and the styrene equivalent number average molecular weight Mn of the modified liquid diene rubber (B1).

(Average number of functional groups per molecule)= [(Number average molecular weight Mn)/(Molecular weight of styrene unit)×(Average molecular weight of units from conjugated diene and optional monomers other than conjugated dienes)]/(Functional group equivalent weight)

The functional group equivalent weight of the modified liquid diene rubber (B1) indicates the mass of the conjugated dienes and optional monomers other than conjugated dienes that are bonded together per one functional group. The functional group equivalent weight may be calculated from the ratio of the area of the peak assigned to the polymer main chains to the area of the peak assigned to the functional groups using $^1$H-NMR or $^{13}$C-NMR. The peak assigned to the functional groups is a peak assigned to alkoxy groups.

Table 1 below describes the properties of the liquid diene rubber (B-1) and the modified liquid diene rubbers (B1-1), (B1-2), (B1-3) and (B1-4) obtained in Production Examples 1 to 5.

TABLE 1

| Liquid diene rubbers | Weight average molecular weight Mw (×10$^3$) | Vinyl content (mol %) | Tg (° C.) | Melt viscosity at 38° C. (Pa · s) | Average number of functional groups per molecule (groups) |
| --- | --- | --- | --- | --- | --- |
| Liquid diene rubber (B-1) | 5.6 | 65 | −49 | 5.6 | 0 |
| Modified liquid diene rubber (B1-1) | 5.7 | 65 | −49 | 6.0 | 2 |
| Modified liquid diene rubber (B1-2) | 30 | 10 | −91 | 85 | 4 |
| Modified liquid diene rubber (B1-3) | 43 | 36 | −45 | 161 | 4 |
| Modified liquid diene rubber (B1-4) | 32 | 36 | −44 | 187 | 3 |

Examples 1 to 9 and Comparative Examples 1 to 5

The solid rubber (A), the liquid diene rubber (B), the silane coupling agent (C), the silica (D), the oil and the antioxidant were added in the amounts (parts by mass) described in Table 2 into a kneader and were kneaded together at 150° C. for 4 minutes. Thereafter, the kneaded mixture was removed from the kneader and was cooled to room temperature. Next, the mixture was placed into the kneader again, and the peroxide was added. The resultant mixture was kneaded for 5 minutes from a start temperature of 60° C. to a maximum temperature of 95° C. A rubber composition was thus obtained.

TABLE 2

|  |  | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| Component (A) | EPDM (A-1) | 100 | 100 | 100 | 100 | 100 | 100 | 100 | 100 | 100 |
| Component (B) | Liquid diene rubber (B-1) |  |  | 10.9 |  | 10.9 |  |  |  |  |
| Component (B) + Component (C) | Modified liquid diene rubber (B1-1) | 12.9 |  |  | 12.9 |  | 11.9 |  |  |  |
|  | Modified liquid diene rubber (B1-2) |  | 11.7 |  |  |  |  |  | 13.6 |  |
|  | Modified liquid diene rubber (B1-3) |  |  |  |  |  |  |  |  | 14.5 |
|  | Modified liquid diene rubber (B1-4) |  |  |  |  |  |  |  |  | 14.9 |
| Component (C) | Silane coupling agent (C-1) |  | 1.2 | 2 |  | 2 |  | 1.2 |  |  |
| Components (D) | Silica (D-1) | 45 | 45 | 45 |  |  |  |  | 45 | 45 |
|  | Silica (D-2) |  |  |  | 45 | 45 | 45 | 45 |  |  |
|  | Silica (D'-1) |  |  |  |  |  |  |  |  |  |
| Optional components | Oil (1) | 29.1 | 29.1 | 29.1 | 29.1 | 29.1 | 30.1 | 28.4 | 28.2 | 27.8 |
|  | Peroxide (1) | 4 | 4 | 4 | 4 | 4 |  |  | 4 | 4 |
|  | Peroxide (2) |  |  |  |  |  | 4 | 4 |  |  |
|  | Antioxidant (1) | 1 | 1 | 1 | 1 | 1 | 1 | 1 | 1 | 1 |

TABLE 2-continued

|  |  | Comp. Ex. 1 | Comp. Ex. 2 | Comp. Ex. 3 | Comp. Ex. 4 | Comp. Ex. 5 |
|---|---|---|---|---|---|---|
| Component (A) | EPDM (A-1) | 100 | 100 | 100 | 100 | 100 |
| Component (B) | Liquid diene rubber (B-1) |  |  |  | 10.9 |  |
| Component (B) + Component (C) | Modified liquid diene rubber (B1-1) |  |  | 12.9 |  |  |
|  | Modified liquid diene rubber (B1-2) |  |  |  |  |  |
|  | Modified liquid diene rubber (B1-3) |  |  |  |  |  |
|  | Modified liquid diene rubber (B1-4) |  |  |  |  |  |
| Component (C) | Silane coupling agent (C-1) | 2 | 2 |  | 2 | 2 |
| Components (D) | Silica (D-1) | 45 |  |  |  |  |
|  | Silica (D-2) |  | 45 |  |  | 45 |
|  | Silica (D'-1) |  |  | 45 | 45 |  |
| Optional components | Oil (1) | 40 | 40 | 29.1 | 29.1 | 40 |
|  | Peroxide (1) | 4 | 4 | 4 | 4 |  |
|  | Peroxide (2) |  |  |  |  | 4 |
|  | Antioxidant (1) | 1 | 1 | 1 | 1 | 1 |

The rubber compositions shown in Table 2 were each compression molded into a shape of 15 cm×15 cm×0.1 cm at 170° C. and 10 MPa. Cured sheets of the crosslinked rubber compositions were thus obtained. Subsequently, the breaking stress, the breaking elongation, the hardness, the storage modulus and the dynamic-to-static modulus ratio were evaluated by the following methods. The results are described in Table 3.

(Breaking Stress and Breaking Elongation)

A JIS dumbbell-shaped No. 3 test piece was punched out from the cured sheet prepared in Example or Comparative Example and was tested with a tensile tester manufactured by Instron in accordance with JIS K 6251 to determine the stress and elongation at break. The larger the value of breaking stress, the higher the mechanical strength of the composition.

(Hardness)

The hardness of the cured sheet prepared in Example or Comparative Example was measured in accordance with JIS K 6253 using a type A hardness meter. The larger the value, the smaller the deformation of the composition and the higher the shape stability.

(Storage Modulus and Dynamic-to-Static Modulus Ratio)

The cured sheets prepared in Examples 1 to 7 and Comparative Examples 1 to 5 were cut to give test pieces having a width of 5 mm. With use of a dynamic viscoelastometer manufactured by NETZSCH, the static storage modulus at a frequency of 1 Hz ($E'_{1Hz}$) and the dynamic storage modulus at a frequency of 100 Hz ($E'_{100Hz}$) were measured at temperatures in the range of −100 to 150° C. The ratio of the dynamic storage modulus to the static storage modulus ($E'_{100Hz}/E'_{1Hz}$) was calculated as the dynamic-to-static modulus ratio. The higher the static storage modulus ($E'_{1Hz}$) the more excellent the composition in durability. The lower the dynamic-to-static modulus ratio ($E'_{100Hz}/E'_{1Hz}$) the higher the vibration insulating properties.

TABLE 3

|  |  | Ex. 1 | Ex. 2 | Ex. 3 | Ex. 4 | Ex. 5 | Ex. 6 | Ex. 7 |
|---|---|---|---|---|---|---|---|---|
| Breaking stress | MPa | 17.5 | 14.1 | 22.8 | 11.5 | 17.2 | 15.1 | 14.1 |
| Breaking elongation | % | 1177 | 1180 | 942 | 1155 | 676 | 286 | 440 |
| Hardness | JIS A | 61 | 57 | 58 | 46 | 50 | 57 | 57 |
| $E'_{1\,Hz}$ (25° C.) | MPa | 10.7 | 8.0 | 9.3 | 7.2 | 6.8 | 6.6 | 6.2 |
| $E'_{100\,Hz}/E'_{1\,Hz}$ (25° C.) |  | 1.31 | 1.27 | 1.37 | 1.21 | 1.23 | 1.13 | 1.16 |
| $E'_{100\,Hz}/E'_{1\,Hz}$ (100° C.) |  | 1.37 | 1.71 | 1.48 | 1.44 | 1.27 | 1.05 | 1.13 |

|  |  | Ex. 8 | Ex. 9 | Comp. Ex. 1 | Comp. Ex. 2 | Comp. Ex. 3 | Comp. Ex. 4 | Comp. Ex. 5 |
|---|---|---|---|---|---|---|---|---|
| Breaking stress | MPa | 18.3 | 18.1 | 13.8 | 15.2 | Liquid diene rubber (B) bled out. | | 6.2 |
| Breaking elongation | % | 1120 | 1050 | 1301 | 847 | | | 307 |
| Hardness | JIS A | 60 | 59 | 52 | 45 | | | 45 |
| $E'_{1\,Hz}$ (25° C.) | MPa | 10.5 | 9.1 | 6.9 | 5.9 | | | 4.9 |
| $E'_{100\,Hz}/E'_{1\,Hz}$ (25° C.) |  | 1.32 | 1.33 | 1.33 | 1.22 | | | 1.35 |
| $E'_{100\,Hz}/E'_{1\,Hz}$ (100° C.) |  | 1.38 | 1.40 | 1.70 | 1.40 | | | 1.40 |

In Table 3, the comparison of Examples 1 to 3 with Comparative Example 1 which all used the silica (D-1) as the silica (D) shows that the cured products obtained from the rubber compositions of the present invention exhibit an enhanced static storage modulus while maintaining or attaining an improvement in dynamic-to-static modulus ratio. Thus, it has been demonstrated that the rubber compositions containing the liquid diene rubber give cured products concurrently satisfying vibration insulating properties and durability. In particular, the cured products obtained from the compositions of Examples 1 and 3 are excellent in static storage modulus at room temperature and in the stability of dynamic-to-static modulus ratio at high temperature. These results show that high durability and excellent vibration insulating properties in a wide range of temperatures can be achieved by adding a liquid diene rubber having a low molecular weight of not more than 10,000 and a vinyl content of about 65 mol %. Further, the composition of Example 1 exhibited a particularly high static storage modulus and a low dynamic-to-static modulus ratio in a wide range of temperatures. Thus, the formation of covalent bonds between the liquid diene rubber and the silane coupling agent constructs a particularly preferred embodiment of the rubber compositions of the present invention.

In Table 3, further, the comparison of Examples 4 and 5 with Comparative Example 2 and the comparison of Examples 6 and 7 with Comparative Example 5 which all used, as the silica (D), the silica (D-2) having a smaller BET specific surface area than the silica (D-1) show that the cured products obtained from the rubber compositions of the present invention exhibit an enhanced static storage modulus while maintaining or attaining an improvement in dynamic-to-static modulus ratio. Thus, it has been similarly demonstrated that the rubber compositions containing the liquid diene rubber give cured products concurrently satisfying vibration insulating properties and durability.

In Table 3, still further, the comparison of Examples 8 and 9 with Comparative Example 1 shows that the cured products obtained from the rubber compositions of the present invention exhibit an enhanced static storage modulus while maintaining or attaining an improvement in dynamic-to-static modulus ratio. Thus, it has been demonstrated that the rubber compositions containing the liquid diene rubber give cured products concurrently satisfying vibration insulating properties and durability.

Moreover, the comparison of Example 1 with Example 4 in Table 3 shows that the cured product obtained using silica with a smaller BET specific surface area has a low static storage modulus and is thus low in durability, but attains a low dynamic-to-static modulus ratio and is thus more excellent in vibration insulating properties. However, as shown by the results of Comparative Examples 3 and 4, the liquid diene rubber which was used together with silica having a BET specific surface area below the range claimed in the present application bled out after curing. Thus, it has been demonstrated that it is important to combine the rubber with silica having the specified BET specific surface area.

(Compression Set)

The rubber compositions shown in Table 2 were each compression molded at 170° C. and 10 MPa to give a cylindrical test piece having a diameter of 13.0±0.5 mm and a thickness (d0) of 6.3±0.3 mm. In accordance with JIS K 6262, the cylindrical test piece was compressively deformed by 25% with use of a spacer having a thickness (d1) of 4.8 mm, held in an atmosphere at 120° C. for 22 hours, and then released from the compression. Thereafter, the test piece was allowed to stand in an atmosphere at 24° C. and 50% relative humidity for 30 minutes, and the thickness (d2: mm) of the cylindrical test piece was measured. The compression set (%) was calculated from 100×(d0−d2)/(d0−d1). The smaller the value, the more excellent the composition in rubber elasticity and shape stability at high temperatures. The results are described in Table 4.

TABLE 4

|  |  | Ex. 1 | Ex. 2 | Ex. 3 | Comp. Ex. 1 |
|---|---|---|---|---|---|
| Compression set (120° C., 22 h) | % | 36.8 | 58.9 | 21.4 | 58.0 |

In Table 4, the low compression sets of Examples 1 and 3 show that the cured products obtained from the rubber composition which includes a liquid diene rubber having a weight average molecular weight of not more than 10,000 and a vinyl content of about 65 mol % have superior shape stability at high temperatures.

Examples 10 to 14 and Comparative Example 6

The solid rubber (A-2), the liquid diene rubber (B), the silane coupling agent (C), the silica (D), the oil and the antioxidant were added in the amounts (parts by mass) described in Table 5 into a kneader and were kneaded together at 150° C. for 4 minutes. Thereafter, the kneaded mixture was removed from the kneader and was cooled to room temperature. Next, the mixture was placed into the kneader again, and the peroxide was added. The resultant mixture was kneaded for 5 minutes from a start temperature of 60° C. to a maximum temperature of 95° C. A rubber composition was thus obtained.

TABLE 5

|  |  | Ex. 10 | Ex. 11 | Ex. 12 | Ex. 13 | Ex. 14 | Comp. Ex. 6 |
|---|---|---|---|---|---|---|---|
| Component (A) | STR-20 (A-2) | 100 | 100 | 100 | 100 | 100 | 100 |
| Component (B) | Liquid diene rubber (B-1) |  |  | 10.9 | 10.9 | 10.9 |  |
| Component (B) + | Modified liquid diene rubber (B1-1) | 11.9 |  |  |  |  |  |
| Component (C) | Modified liquid diene rubber (B1-2) |  | 13.6 |  |  |  |  |
|  | Modified liquid diene rubber (B1-3) |  |  |  | 14.5 |  |  |
|  | Modified liquid diene rubber (B1-4) |  |  |  |  | 14.9 |  |
|  | Silane coupling agent (C-1) |  |  | 2 |  |  | 2 |
| Component (D) | Silica (D-1) | 45 | 45 | 45 | 45 | 45 | 45 |
| Optional | Oil (1) | 30.1 | 29.1 | 29.1 | 28.2 | 27.8 | 40 |
| components | Peroxide (1) |  | 4 | 4 | 4 | 4 | 4 |
|  | Peroxide (2) | 4 |  |  |  |  |  |
|  | Antioxidant (1) | 1 | 1 | 1 | 1 | 1 | 1 |

The rubber compositions shown in Table 5 were each compression molded into a shape of 15 cm×15 cm×0.2 cm at 80° C. and 10 MPa, and cut to give four circles having a diameter of 16 mm. The circles were stacked on top of one another and were crosslinked at 170° C. under a pressure of 10 MPa. A test piece (a cured product of the crosslinked rubber composition) having a diameter of 16 mm and a thickness of 8 mm was thus obtained. Subsequently, the test piece was tested to evaluate the hardness, the storage modulus and the dynamic-to-static modulus ratio. The results are described in Table 6. The hardness was evaluated by the same method as in Table 3, and the storage modulus and the dynamic-to-static modulus ratio were evaluated by the following method.

(Storage Modulus and Dynamic-to-Static Modulus Ratio)

With use of a dynamic viscoelasticity tester (trade name: "EPLEXOR" manufactured by GABO GmbH), the test pieces (the cured products) 16 mm in diameter and 8 mm in thickness which were prepared in Examples 10 to 14 and Comparative Example 6 were compressed by 5% at a test temperature of 25° C., and thereafter the storage modulus at a frequency of 1 Hz ($E'_{1Hz}$) and the storage modulus at a frequency of 100 Hz ($E'_{100Hz}$) were measured with a dynamic strain of 0.2%. The ratio of the dynamic storage modulus to the static storage modulus ($E'_{100Hz}/E'_{1Hz}$) was calculated as the dynamic-to-static modulus ratio. The higher the static storage modulus ($E'_{1Hz}$) the more excellent the composition in durability. The lower the dynamic-to-static modulus ratio ($E'_{100Hz}/E'_{1Hz}$) the higher the vibration insulating properties.

TABLE 6

|  |  | Ex. 10 | Ex. 11 | Ex. 12 | Ex. 13 | Ex. 14 | Comp. Ex. 6 |
|---|---|---|---|---|---|---|---|
| Hardness | JIS A | 59 | 57 | 56 | 58 | 58 | 50 |
| $E'_{1\,Hz}$ (25° C.) | MPa | 6.39 | 5.58 | 5.70 | 6.20 | 6.15 | 4.31 |
| $E'_{100\,Hz}/E'_{1\,Hz}$ (25° C.) |  | 1.045 | 1.049 | 1.055 | 1.050 | 1.052 | 1.059 |

In Table 6, the comparison of Examples 10 to 14 with Comparative Example 6 which all used the silica (D-1) as the silica (D) shows that the cured products obtained from the rubber compositions of the present invention exhibit an enhanced static storage modulus while maintaining or attaining an improvement in dynamic-to-static modulus ratio. Thus, it has been demonstrated that the rubber compositions containing the liquid diene rubber give cured products concurrently satisfying vibration insulating properties and durability.

TABLE 7

|  |  | Ex. 15 | Ref. Ex. 1 |
|---|---|---|---|
| Component (A) | STR-20 (A-2) | 100 | 100 |
| Component (B) | Liquid diene rubber (B-1) |  |  |
| Component (B) + Component (C) | Modified liquid diene rubber (B1-1) | 12.9 | 12.9 |
|  | Modified liquid diene rubber (B1-2) |  |  |
|  | Modified liquid diene rubber (B1-3) |  |  |
|  | Modified liquid diene rubber (B1-4) |  |  |
| Component (C) | Silane coupling agent (C-1) |  | 2 |
| Component (D) | Silica (D-1) | 45 | 45 |

TABLE 7-continued

|  |  | Ex. 15 | Ref. Ex. 1 |
|---|---|---|---|
| Optional components | Oil (1) | 29.1 | 40 |
|  | Peroxide (1) | 4 | 4 |
|  | Peroxide (2) |  |  |
|  | Antioxidant (1) | 1 | 1 |
|  | Aluminum hydroxide | 100 | 1 |

The rubber compositions shown in Table 7 were each treated at 80° C. and 10 MPa and cut to give a test piece having a thickness of 1.5 mm, a width of 13 mm and a length of 130 mm. Flame from a Tirrill burner was applied for 10 seconds to the lower portion of the test piece held in a vertical position, and the burning time was measured. The flame retardancy was evaluated as A when the burning time was not more than 10 seconds, as B when the burning time was more than 10 seconds and not more than 30 seconds, and as C when the burning time was more than 30 seconds.

TABLE 8

|  | Ex. 15 | Ref. Ex. 1 |
|---|---|---|
| Flame retardancy Burning test of 1.5 mm thick test piece in vertical position | A | B |

As shown in Table 8, the cured product obtained from the rubber composition containing aluminum hydroxide exhibited higher flame retardancy.

INDUSTRIAL APPLICABILITY

The rubber compositions of the present invention have excellent processability and filler dispersibility. Further, when rendered crosslinkable by the addition of a crosslinking agent or the like, the rubber compositions give cured products which contain a filler dispersed therein in a state that is ideal for enhancing properties and which thus can concurrently achieve high levels of durability and vibration insulating properties, thereby finding suitable use in numerous applications such as industrial members. In particular, such cured products are suited and useful as rubber vibration insulators requiring vibration insulating properties.

The invention claimed is:

1. A rubber composition comprising a solid rubber (A), a liquid diene rubber (B), a silane coupling agent (C), silica (D) having a BET specific surface area of 30 to 200 $m^2/g$, and a crosslinking agent,
   wherein the solid rubber (A) is at least one selected from the group consisting of natural rubbers and ethylene propylene diene rubbers,
   the crosslinking agent is a peroxide having a structure represented by the following formula (3), wherein $R^1$ and $R^2$ are each a substituted or unsubstituted, linear or branched, alkyl group having

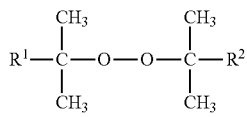

1 to 5 carbon atoms, or a substituted or unsubstituted monovalent aromatic hydrocarbon group having 6 to 10 carbon atoms, and the liquid diene rubber (B) is a modified liquid diene rubber (B1A) that has a functional group that is a partial structure represented by the following formula (2),

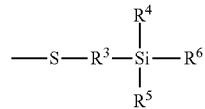

wherein $R^3$ is a C1-C6 divalent alkylene group, and $R^4$, $R^5$ and $R^6$ are each independently a methoxy group, an ethoxy group, a phenoxy group, a methyl group, an ethyl group or a phenyl group, with the proviso that at least one of $R^4$, $R^5$, and $R^6$ is a methoxy group, an ethoxy group or a phenoxy group, and the average number of the functional groups of the partial structure represented by the formula (2) per molecule of the modified liquid diene rubber (B1A) is 1 to 9, and the weight average molecular weight of the liquid diene rubber (B) is not less than 5,700 and not more than 60,000.

2. A cured product obtained by crosslinking the rubber composition described in claim 1.

3. A rubber vibration insulator comprising the cured product described in claim 2.

* * * * *